(12) United States Patent
Goldfarb et al.

(10) Patent No.: US 9,088,660 B2
(45) Date of Patent: Jul. 21, 2015

(54) MESSAGING AND APPLICATION SYSTEM INTEGRATION

(75) Inventors: Gregory Lloyd Goldfarb, Half Moon Bay, CA (US); Ramani Narayan, Cupertino, CA (US)

(73) Assignee: BT Americas Inc., Irving, TX (US)

( * ) Notice: Subject to any disclaimer, the term of this patent is extended or adjusted under 35 U.S.C. 154(b) by 1709 days.

(21) Appl. No.: 12/210,006

(22) Filed: Sep. 12, 2008

(65) Prior Publication Data

US 2009/0074159 A1    Mar. 19, 2009

Related U.S. Application Data

(60) Provisional application No. 60/972,713, filed on Sep. 14, 2007.

(51) Int. Cl.
| H04M 1/57 | (2006.01) |
| H04M 3/42 | (2006.01) |
| H04M 3/533 | (2006.01) |

(Continued)

(52) U.S. Cl.
CPC ............ *H04M 3/5335* (2013.01); *H04M 1/247* (2013.01); *H04M 1/2477* (2013.01); *H04M 1/57* (2013.01); *H04M 3/42042* (2013.01); *H04M 3/42059* (2013.01); *H04M 3/533* (2013.01); *H04M 3/537* (2013.01); *H04M 1/575* (2013.01); *H04M 3/42068* (2013.01);

(Continued)

(58) Field of Classification Search
CPC .......... H04M 1/575; H04M 2203/252; H04M 3/42068; H04M 3/5335; H04M 3/53358; H04M 3/533; H04M 1/247; H04M 1/2477; H04M 1/57; H04M 3/42042; H04M 3/42059; H04M 3/537; H04M 2203/253

USPC ......... 455/412.2, 413, 415; 379/88.11, 88.12, 379/88.14, 88.18, 88.2, 88.21, 88.26, 88.17, 379/142.06

See application file for complete search history.

(56) References Cited

U.S. PATENT DOCUMENTS 6,219,407 B1 *  4/2001  Kanevsky et al. ......... 379/88.02
6,327,343 B1 * 12/2001  Epstein et al. ............ 379/88.01

(Continued)

FOREIGN PATENT DOCUMENTS

| KR | 10-2005-0091247 | 9/2005 |
| WO | WO-2009038667 A2 | 3/2009 |
| WO | WO-2009038667 A3 | 3/2009 |

OTHER PUBLICATIONS

"International Application Serial No. PCT/US2008/010650, Search Report mailed Mar. 27, 2009", 3 pgs.

(Continued)

*Primary Examiner* — Lisa Hashem
(74) *Attorney, Agent, or Firm* — Schwegman Lundberg & Woessner, P.A.

(57) ABSTRACT

A system includes receiving a voicemail data object at a business application system. The voicemail data object is associated with a voicemail originated from a caller, and includes a caller identifier identifying the caller that originated the voicemail. The voicemail data object is automatically associated with an entity data object of the business application system, the association being based on the caller identifier. A voicemail indicator is presented to a user of the business application system based on the association, the presentation of the voicemail indicator being in conjunction with presenting of caller identification information for the caller.

31 Claims, 12 Drawing Sheets

(51) Int. Cl.
  *H04M 1/247* (2006.01)
  *H04M 3/537* (2006.01)

(52) U.S. Cl.
  CPC .... *H04M 3/53358* (2013.01); *H04M 2203/252* (2013.01); *H04M 2203/253* (2013.01)

(56) References Cited

U.S. PATENT DOCUMENTS

| | | | |
|---|---|---|---|
| 6,408,176 B1* | 6/2002 | Urs | 455/413 |
| 6,853,710 B2* | 2/2005 | Harris | 379/142.01 |
| 6,912,272 B2* | 6/2005 | Kirk et al. | 379/88.01 |
| 7,003,305 B2* | 2/2006 | Urs | 455/466 |
| 7,283,808 B2* | 10/2007 | Castell et al. | 455/413 |
| 7,286,658 B1* | 10/2007 | Henderson | 379/142.04 |
| 7,564,960 B2* | 7/2009 | Urban et al. | 379/142.01 |
| 7,664,636 B1* | 2/2010 | Hirschberg et al. | 704/231 |
| 7,894,580 B2* | 2/2011 | Veen et al. | 379/88.22 |
| 7,894,583 B2* | 2/2011 | Liou | 379/142.06 |
| 8,140,057 B2* | 3/2012 | Grosch et al. | 455/412.2 |
| 8,290,126 B2* | 10/2012 | Chatterjee et al. | 379/88.19 |
| 8,619,959 B2* | 12/2013 | Baccay | 379/142.04 |
| 8,638,911 B2* | 1/2014 | Balasaygun et al. | 379/88.22 |
| 8,688,082 B2* | 4/2014 | Sigmund et al. | 455/413 |
| 2002/0065897 A1 | 5/2002 | Voticky et al. | |
| 2002/0128036 A1* | 9/2002 | Yach et al. | 455/552 |
| 2004/0096046 A1* | 5/2004 | Lection et al. | 379/142.06 |
| 2005/0050146 A1* | 3/2005 | Jani et al. | 709/206 |
| 2005/0069101 A1* | 3/2005 | Bear et al. | 379/88.17 |
| 2005/0130641 A1* | 6/2005 | Lorraine Scott | 455/418 |
| 2006/0007051 A1 | 1/2006 | Bear et al. | |
| 2006/0159237 A1 | 7/2006 | Clark et al. | |
| 2006/0251223 A1* | 11/2006 | Vitikainen et al. | 379/67.1 |
| 2007/0047726 A1* | 3/2007 | Jabbour et al. | 379/373.02 |
| 2007/0206752 A1* | 9/2007 | Nguyen et al. | 379/142.06 |
| 2007/0242809 A1* | 10/2007 | Mousseau et al. | 379/88.18 |
| 2007/0248221 A1* | 10/2007 | Chatterjee et al. | 379/211.02 |
| 2007/0293206 A1* | 12/2007 | Lund | 455/415 |
| 2008/0171535 A1* | 7/2008 | Carmody et al. | 455/412.2 |
| 2008/0215323 A1* | 9/2008 | Shaffer et al. | 704/246 |
| 2008/0317222 A1* | 12/2008 | Griggs et al. | 379/88.14 |
| 2009/0006085 A1* | 1/2009 | Horvitz et al. | 704/223 |
| 2009/0059818 A1* | 3/2009 | Pickett | 370/259 |
| 2009/0144655 A1* | 6/2009 | Hardy et al. | 715/803 |
| 2009/0197583 A1* | 8/2009 | Penn et al. | 455/415 |
| 2009/0252305 A1* | 10/2009 | Rohde et al. | 379/88.13 |
| 2010/0158211 A1* | 6/2010 | Chatterjee et al. | 379/88.12 |
| 2010/0166157 A1* | 7/2010 | Hirschberg et al. | 379/88.02 |
| 2010/0257249 A1* | 10/2010 | May et al. | 709/206 |
| 2010/0273457 A1* | 10/2010 | Freeman et al. | 455/412.2 |
| 2010/0322395 A1* | 12/2010 | Michaelis et al. | 379/88.14 |
| 2011/0231494 A1* | 9/2011 | Pasquero et al. | 709/206 |
| 2013/0344849 A1* | 12/2013 | Chatterjee et al. | 455/413 |

OTHER PUBLICATIONS

"International Application Serial No. PCT/US2008/010650, Written Opinion mailed Mar. 27, 2009", 4 pgs.

* cited by examiner

FIG. 7

| Home | Leads | Contacts | Accounts | Opportunities | Campaigns | Ribbit | Admin ▽ |

Ribbit

8 New Messages profile found
greg.goldfarb@goRib
6504305757

[Logout]

| H | P | K | M |
[Home]

☆ Leads
Home

View: All Open Leads ▽ [Go!]   Edit | Create New View

Recent Leads                                [New]

| Name | Company | New Message |
|---|---|---|
| Johnso, Bill | Cal Development Corp | △ |
| Waters, Crick | E&O Corp | △ |
| Subramanian, Venkat | Orange Partners | |
| Lynch, Carl | Greenview Dev Co | |
| Griggs, Ted | Mainline Dev Corp | △ — 702 |
| Carrol, Dave | Salesforce.com | |
| Dean, M | Company | |
| Harpaz, Rani | Skybox Security | |
| Louie, Gilman | Alsop Louie Partners | |
| Kreaden, Mike | Salesforce.com | |
| Sever, Dan | L Corp Development | |
| Im, Chris | R Development Corp | |

Show 10 items

MESSAGING AND APPLICATION SYSTEM INTEGRATION

CROSS REFERENCE TO RELATED APPLICATION

This application claims the benefit of U.S. Provisional Patent Application Ser. No. 60/972,713 filed Sep. 14, 2007 ("MESSAGING AND APPLICATION SYSTEM INTEGRATION"), which application is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Ribbit Corporation, All Rights Reserved.

BACKGROUND

In a world of increasing electronic communications and network connectivity, users are being inundated (and in certain circumstances overwhelmed) by the influx of messages received via multiple channels. Consider the case of an individual who may have personal and business email accounts, personal and business telephone numbers, and an instant messaging account. It will be appreciated that the organization and processing of messages received through these various contact points and mechanisms can be daunting.

In the case of a business user, there also exists the risk that high priority messages may become difficult to identify and prioritize, given the large number of communications that such a business user may be receiving. Ideally, such a business user would be able to readily identify and respond to high priority messages originating from an important client. While certain messaging applications today enable users to define rules to surface messages from certain recipients, the implementation of such rules may be beyond the technical capabilities of many users.

There exist a number of technical challenges to the processing of messages that may be received by a user through any one or more of a number of communication channels and contact mechanisms.

BRIEF DESCRIPTION OF DRAWINGS

Some embodiments are illustrated by way of example and not limitation in the figures of the accompanying drawings in which:

FIGS. 5-11 are screenshots illustrating respective interfaces that may be generated within the context of an application system, and showing the output of example message integration within an application system.

DETAILED DESCRIPTION

Figure 1:
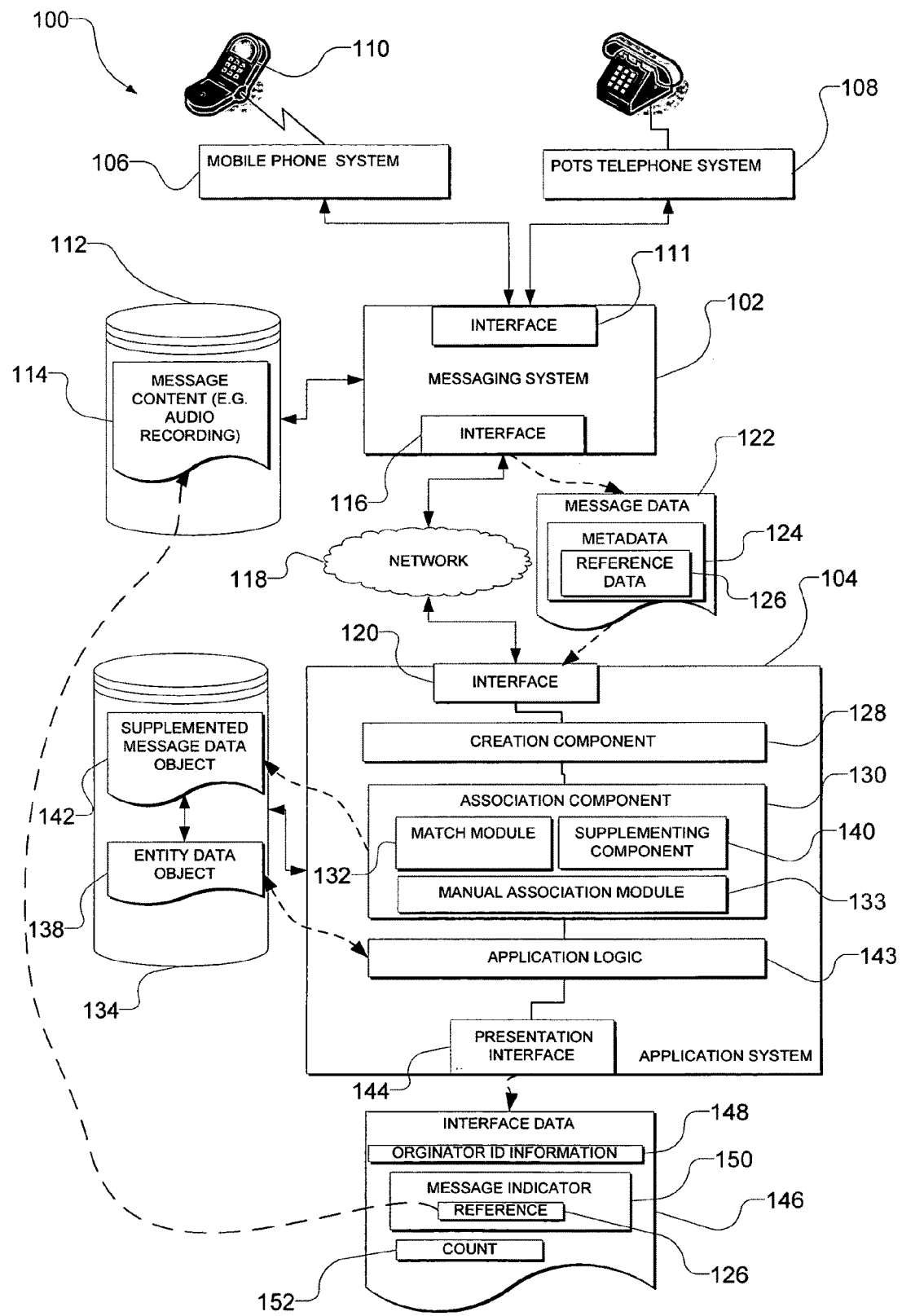
FIG. 1 is a block diagram illustrating an integrated messaging and application environment, within which an example embodiment may be deployed.

In the following description, for purposes of explanation, numerous specific details are set forth in order to provide a thorough understanding of some example embodiments. It will be evident, however, to one skilled in the art that the present invention may be practiced without these specific details.

In an example embodiment, interfacing of a messaging system (e.g., a voicemail system) and an application system (e.g., a business application system, such as a CRM system) is achieved through an interface. The interface processes message data (including referenced message content), received at a messaging system, as a data object within the application system. The interface may process message data to generate a message data object that integrates with a data model and a data framework of an application system. The capability is provided to process the message data object within the application system using the application logic and functions of the application system. Accordingly, message data objects may be treated and processed as "native" data objects of the application system, in an example embodiment.

In an example embodiment, message data (e.g., voicemail data) may be generated or received at either the messaging system or the application system. This message data is associated with a message that originated from a message originator (e.g., a caller), and includes an originator identifier (e.g., a caller identifier) that identifies the message originator. The caller identifier may include any one or more of a caller telephone number, a caller name, a caller address, a caller account number, an account identifier, a project identifier, or a purchase order number.

A message data object, compatible with a data model and/or data framework of the application system, is then generated according to a data model and/or data framework schema of the application system. In one example embodiment, the creation of the message data object may be performed at the message system. The message data object may then be communicated from the messaging system to the application system. In another embodiment, "raw" or unprocessed messaging data may be communicated from the messaging system to the application system, and the message data object may then be created at the application system.

The message data object is then automatically associated with an entity data object (e.g., a user data object, organizational data object etc.) of the application system, this association being based on the originator identifier included in the original message data.

Based on the association of the message data object with the entity data object, the application system may then present a messaging indicator to a user of the application system. The presentation of the message indicator may be performed in conjunction with the presentation of originator identification information identifying the message originator (e.g., the name of a caller that originated a voicemail message).

In addition to the presentation of message indicators in conjunction or in association with message originator identification information, the application system may perform other processing, or generate other output, based on its ability to handle the message data object as a "native" data object of the application system.

In this way, it will be appreciated that message data objects may be conveniently categorized and organized around entity data objects (e.g., user data objects) within the application system. Consider for example where the message data object is a voicemail data object that is automatically associated with a user data object. The application system may accordingly automatically create "voicemail boxes" for entities (e.g., customers) for which entity data objects exist within the application system. For example, one or more voicemails received at a voicemail message system may be visually represented within a "virtual voicemail box" associated with the customer within the context of the application system. Similarly, voicemail messages received from employees of a particular customer organization may be associated with the particular customer data object within the application system, and conveniently presented to a user of the application system as having originated from the relevant customer organization. The application system may, in this way, provide an indication (e.g., visual or otherwise) to a user of the application system of the receipt of one or more voicemail messages from customers of the organization. The application system may also provide other information, such as a count of messages received, to the user.

In addition to merely presenting an indication and count of receipt of voicemail messages from employees of a particular customer organization, the application system may furthermore enable the user of the application system to receive and consume the content of such voicemail messages. To this end, in one example embodiment, a voicemail data object may include a reference (e.g., a Uniform Resource Locator (URL)) that points to a storage location from which the message content is retrievable by a user. This storage location may be associated with the application system, with the messaging system, or may be a remote storage facility provided by a third party.

One embodiment also provides for the instantiation of a new entity data object within the application system, if an originator identifier included within the message data does not correspond to any entity for which an object or record exists within the application system. To this end, upon receipt of message data at the application system, a determination may be made as to whether the originator identifier corresponds to any entity identification information stored within the application system. If not, a new entity data object (e.g., representative of a new customer) may be instantiated within the application system.

A message data object may, in one embodiment, also be supplemented with additional information, regarding a relevant entity, stored by the application system. For example, a voicemail data object may be supplemented with CRM data, where the application system is a CRM system.

A message data object may also be manually associated with one or more entity data objects of the application system by a user. For example, a user may wish to associate a particular voicemail data object with a particular customer data object based on personal knowledge of the user that may not be automatically discernable.

A messaging data object, in an example embodiment, may include metadata pertaining to an original message, such as the originator identifier, a recipient identifier, time and date information indicating a time and date in which the message was received, storage files information indicating the size of the original message content, and duration information indicating, for example, the duration of a voicemail. Other metadata may include note information pertaining to the voicemail, tag information to categorize the voicemail, text transcription of the voicemail, accessed/unaccessed status information, follow-up required information, urgency information, and association information with other objects of the business application system.

In this way, example embodiments provide a Software as a Service (SaaS) based architecture to translate an unsorted collection of messages (e.g., voicemails) from any one of a number of phone service subscribers into a format, understandable by an application system. The application system may create individualized "message boxes" for a number of message originators, and may also generate message indicators which are associated with these received messages. The individualized message boxes and indicators may, in an example embodiment, be displayed in the context of a web-based software application (e.g., a CRM web-based software application) that has information pages for each of the individual message originators (e.g., customers). With this functionality, users of an application system may automatically be presented with an organized archive of relevant messages that are accessible through the same channel (e.g., a portal) used to manage other information relevant to the specific message originator. New messages from a particular message originator may be added to a list of earlier messages in a particular individualized message box.

Users of the application system may also be provided with the capability to retrieve, forward, reply to and delete messages from within the context of such individualized message boxes.

Users may also be presented with live "new message" indicators that are specific to entity objects (e.g., person records) within a database of the application system. For example, when looking at a list of contacts in the application system (e.g., a CRM system), a user may conveniently be able to determine which persons (e.g., customers) on the contact list have left new messages, and how many messages have been received from that relevant person. Message originator specific indicators provide a user of the application system with the visibility and control to access messages in any desired order from commonly used list views within the application system.

In an example embodiment, integration between a messaging system and an application system may be achieved by message routing over a network (e.g., the Internet), database integration between the messaging system and the application system, remote login to the application system, and identifier-based queries between a database of the messaging system and a database of the application system. Additionally, an interface (e.g., a web-based interface) may conveniently be embedded within the application system so as to enable the display, retrieval and management of messages, the content of which may be stored within databases of the message system.

The integration may, in one embodiment, be facilitated by the automatic "tagging" (or other classification) of message data, based on matching records within a database of the messaging system and a database of the application system. Further, the application system may be enabled to display message data objects in a database of the application system.

While an example embodiment will be described within the context of a voicemail messaging system and a CRM application system, it will be appreciated that other embodiments may be deployed using other messaging and application systems. For example, the messaging system may be an email, Short Message Service (SMS), Instant Messaging (IM) or facsimile transmission messaging service. Similarly, the application system may be an Enterprise Resource Planning (ERP), accounting, conferencing (e.g., WEBEX CONNECT application), or an office productivity application (e.g. GOOGLE Apps, or MICROSOFT OFFICE) application system.

FIG. 1 is a block a diagram illustrating an environment 100 having an integrated messaging system 102 (e.g., a voicemail system) and application system 104 (e.g., a CRM application). The messaging system 102 is shown to be coupled to one or more communication systems, such as the mobile phone system 106, and the Plain Old Telephone Service (POTS) telephone system 108. The messaging system 102 may be a standalone messaging system that provides messaging services to each of the communication systems 106, 108, or may in fact be an integrated component of a communication system. Taking the mobile phone system 106 as an example, a user of a mobile phone 110 may be directed from the mobile phone system 106 to the messaging system 102 in the event that a called entity (the voicemail recipient) did not respond to a phone call. To this end, the messaging system 102 is shown to include an interface 111 through which it interfaces with the communication systems.

A message system database 112 is communicatively coupled to the messaging system 102 so as to enable read and write access by the messaging system 102 to the database 112. Accordingly, the messaging system 102 is able to store message content 114 (e.g., audio recordings, which may be stored as MP3 files etc.), and retrieve message content 114 from, the message system database 112.

The messaging system 102 includes a further interface 116, via which it interfaces with the application system 104 over a network 118 (e.g., the Internet). In this way, the messaging system 102 is communicatively coupled to the application system 104.

The application system 104 similarly includes an interface 120 (e.g., an Application Program Interface (API)) through which it may communicate with the messaging system 102. Via the respective interfaces 116, 120 and the network 118, the messaging system 102 may communicate message data 122 to the application system 104. In one embodiment, the message data 122 may be "raw" or unprocessed message data (e.g., not instantiated as an object or record of the application system 104). The message data 122 may encompass metadata 124 regarding message content 114 as stored within the message system database 112. This metadata 124 may in turn include reference data 126 (e.g., a URL) that references a location from which the message content 114 is retrievable. For example, the reference data 126 may be a URL that is invocable to initiate a download or streaming of a particular instance of message content 114 from within the message system database 112.

The application system 104 includes a message data object creation component 128 that is communicatively coupled to receive the message data 122, via the interface 120. The message data object creation component 128, in an example embodiment, operates to automatically create a message data object (e.g., a voicemail data object) based on the received message data. To this end, the creation component 128 may process and format the message data into an object or record according to a schema of the application system 104.

The creation component 128 is, in turn, communicatively coupled to an association component 130 which operatively associates a message data object with an entity data object of the application system 104. For example, the association component 130 may operate to automatically associate a voicemail data object with a customer data object of a CRM system. In one embodiment, this association is achieved using a matching module 132 which matches a message originator identifier (e.g., a caller identifier) with an entity identifier (e.g., a customer identifier). To this end, the association component 130, and specifically the matching module 132, may access an application system database 134 containing objects or records for entities of the application system 104. The matching module 132 may, using a message originator identifier parsed and extracted from the message data 122, seek to match that identifier with an entity identifier of an object or record within the database 134.

On detecting a match between respective identifiers, the association component 130 may then automatically create and instantiate an association between the message data object and a matching entity data object. In one example embodiment, this association may be achieved through an index linking between the respective objects.

The association component 130 may also include a manual association module 133, which, as will be described in further detail below, may enable a user of the application system 104 to manually create an association between a message data object 142 and an entity data object 138.

The application system 104 is also shown to include a supplementing component 140 which operatively supplements a message data object to generate a supplemented message data object 142, which is stored in the application system database 134. The supplementing component 140 may, in one embodiment, supplement an original message data object with other data accessible to the application system 104. For example, the supplementing component 140 may supplement message data object 142 with data that is known as a result of the association of the message object with a particular entity data object 138. In the example embodiment where the application system 104 is a CRM application, the supplemented message data object 142 may be supplemented to include, merely for example, relationship stage data indicating a relationship stage between a particular user of the CRM system and an entity (e.g., a customer) associated with the entity data object 138. The supplemented message data object may also include task data identifying tasks associated with a relationship, other entities related to a particular relationship, or opportunity data related to an opportunity associated with a customer.

The application system 104 also includes application logic 143, which is specific to the application system type. For example, the application logic 143 may comprise CRM logic to support CRM functions and processes provided by a CRM system.

The application system 104 further includes a presentation interface 144 (e.g., a web interface) that operatively generates and outputs interface data 146 (e.g., HyperText Markup Language (HTML)). The presentation interface 144 may generate a number of different types of interface data 146 utilized to generate various types of interfaces (e.g., various configurations of HTML to be rendered by a browser info different interfaces). The interface data 146 may include originator identification information 148 (e.g., the name of a caller that left a voicemail message), message indicator data 150 (e.g., an icon indicating a newly received message), and count data 152, indicating for example, a number of messages received from an originator identified by the originator identification information 148. The message indicator data 150 may also include the reference data 126 (e.g., a URL), which may be used by a user of the application system 104 to access message content 114 (e.g., a voicemail).

The interface data 146 may also include a number of instances of message indicator data 126, each of which is associated with a respective instance of message content 114. For example, where a message originator (e.g., a caller) has left a number of voicemails, a separate and discrete message indicator may be presented within an interface for each of these messages, together with a unique reference 126 (e.g., URL) using which the specific message content is retrievable. Likewise, the interface data 146 may include a number of instances of originator identification information 148 (e.g., in the case where the interface data is used to generate a contact list interface), and each instance of originator identification information 148 may be displayed in conjunction with one or more instances of message indicator data 150.

Figure 2:
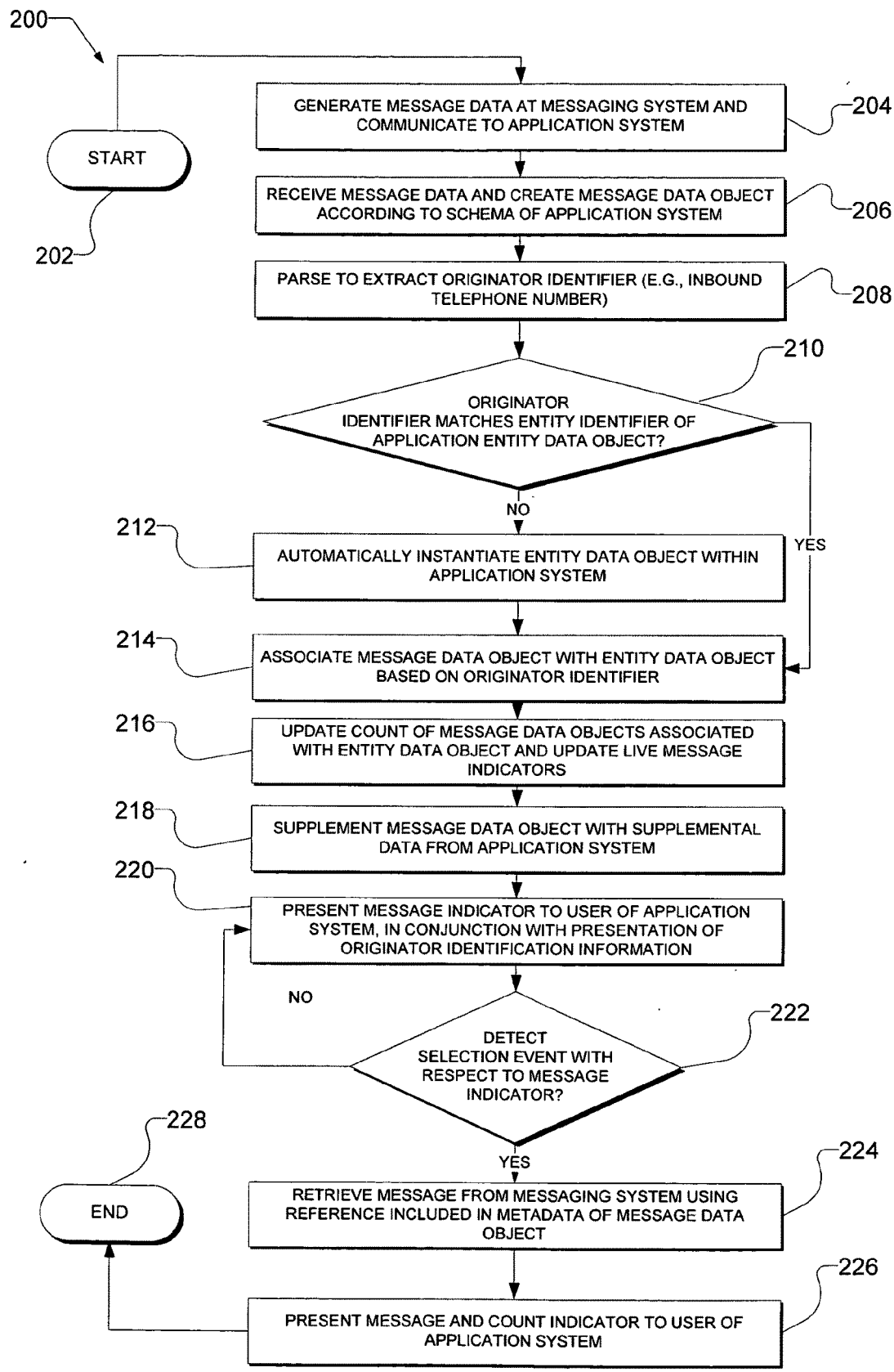
FIG. 2 is a flowchart illustrating a method, according to an example embodiment, to process message data received at an application system.

FIG. 2 is a flowchart illustrating a method 200, according to an example embodiment, to interface between a messaging system 102 and an application system 104. The method 200 may be performed by the various components of the respective messaging and application systems 102 and 104 described above. It will be appreciated that while the operations of the method 200 are described as being performed in an example embodiment by specific components or modules, in other embodiments, functionality may be distributed in various ways amongst various components and modules of relevant systems.

The method 200 commences at operation 202, and proceeds to operation 204 with the generation of message data at a messaging system 102. In one embodiment, the message data is generated in a messaging system format in which the messaging system 102 processes and stores the message data within the message system database 112. From the perspective of the application system 104, the message data may accordingly be regarded as being in a "raw form". The generated message data may furthermore include metadata pertaining to an instance of message content 114, again stored within the database 112. The metadata, as noted above, may include reference data (e.g., a URL) referencing the location within which an instance of message content 114 is stored within the database 112. Other examples of metadata have been provided above. The generation of the message data may be performed by a data component (not shown) within the messaging system 102, responsive to receipt of messaging content from any one or more of the communication systems (e.g., the mobile phone system 106 or the POTS telephone system 108) that interface with the messaging system via the interface 111.

Also, at operation 204, the messaging system 102, via the interface 116 (e.g., an API) communicates the message data 122 to the application system 104.

In another embodiment, the messaging system 102 may include a creation component (e.g., similar to the creation component 128 described above with reference to FIG. 1) that enables the creation of a message data object 142, formatted according to a data framework or a schema of the application system 104, at the messaging system 102. In this embodiment, the messaging system 102 may then, as opposed to communicating "unprocessed" message data, communicate an instantiated message data object 142. In this embodiment, a creation component 128 may or may not be required at the application system 104.

Returning to a description of the embodiment in which message data 122 is sent from the messaging system, at operation 206, the application system 104, via the network 118 and the interface 120, receives the messagedata 122. Also, at operation 206, the creation component 128 proceeds to create a message data object 142, formatted according to a data framework or a schema of the application system 104. The message data object 142 may then be stored within the application system database 134 by the creation component 128.

At operation 208, the association component 130 receives the message data object, and parses the message data object to extract an originator identifier, originally included in the metadata 124 of the message data 122. For example, the originator identifier may be an inbound telephone number identifying a caller that originated a voicemail message.

At determination operation 210, the matching module 132 automatically determines whether the originator identifier matches an entity identifier of an identity data object. For example, the inbound telephone number may be compared to telephone numbers stored within entity data object 138 within the database 134.

In the event that no match is found at operation 210, at operation 212, the creation component 128 may again be invoked to automatically create and instantiate an entity object within the application system, based on the determination that the message data object 142 is not related to any one of multiple entity data objects 138 of the application system 104. Again, if the inbound telephone number, for example, does not match any telephone numbers of entity data objects, a new entity data object 138 may be instantiated, and populated with the inbound telephone number.

Upon completion of the operation 212, or if on the other hand an originator identifier does match an entity identifier at operation 210, the method 200 progresses to operation 214. At operation 214, the association component 130 builds an association (or a relationship) between the message data object 142 and the matched (or newly created matching) entity data object 138. This association is based, in an example embodiment, upon the originator identifier (e.g., the inbound telephone number). As noted above, the association between the data objects 142 and 138 may be achieved through index referencing between these objects. Objects 142 and 138 may also be related by other identifiers of the inbound caller identifiers including name, email address, or instant messaging ID.

At operation 216, the association component 130 may also update a count or total of message data objects that are associated with a particular entity data object. To this end, an entity data object 138 may include a "count" field in which a count value is maintained, indicating a number of message data objects associated with the relevant entity data object. In one embodiment, it will be appreciated that multiple types of message data objects may exist. For example, email, and voicemail data objects may be associated with one particular entity data object 138. In this case, a separate count for each of these message data object types may also be maintained. Upon association of a message data object 142 with an entity data object 138, a count (which may be type-specific) is incremented. It will be appreciated that when a message data object 142 is deleted, or the status thereof changes from "not accessed" to "accessed", a count value may also be modified (e.g., decremented). To this end, in addition to maintaining a count of different types of message data objects, an entity data object 138 may also be updated to maintain a count of message data objects of a particular status (e.g., accessed, not accessed, deleted, forwarded, etc.). These counts may be updated responsive to events that occur within the context of the application system 104.

Moving onto operation 218, the supplementing component 140 may then supplement a message data object 142 with supplemental data retrieved from, or accessible by, the application system 104. Again, examples of such supplemental data have been provided above with reference to an example CRM system implementation. It will be appreciated that the supplemental information need not be data stored within the application system database 134. The application system 104, based information within an associated entity data object 138, may supplement the message data object 142 with information retrieved from external sources. For example, consider the example where the entity data object 138, associated with a particular message object, identifies that an address of a customer represented by the entity data object 138 is in a different time zone from a user of the application system 104. In this case, the message data object 142 may be supplemented with "call" and "do not call" times within the user's time zone. Accordingly, when presenting a message indicator (as will be described in further detail below), the message indicator may be visually presented, or supplemented, to provide an indication regarding whether a current time is or is not a good time to initiate a return call to the voicemail originator. Of course, the message data object 142 could be supplemented in any number of other ways.

At operation 220, the presentation interface 144 may present a message indicator 150 to a user of the application system 104, in conjunction with a presentation of originator identification information 148. As discussed above, this presentation may include generating an HTML document to be communicated to a browser executing on a computer system of the user, the browser to then render the HTML document into an interface within which the message indicator is presented.

At decision operation 222, a determination is made as to whether a selection event occurs with respect to the message indicator 150, and specifically with respect to the reference data 126 which may be associated with the message indicator (e.g., a URL associated with a message indicator icon). Of course, the reference data need not be directly associated with the indicator, but could be displayed in conjunction therewith. In any event, in the absence of detecting such a selection event, the method 200 may loop back to operation 220. However, if a selection event is detected at decision operation 220, at operation 224, the message content may be retrieved (e.g., by a browser operating on a user computer system) from the message system database 112, based on the reference data 126 that was originally included within the metadata 124. In an example embodiment in which the message content 114 is an audio recording of a voicemail, the retrieving of the voicemail recording may include streaming of the recording to a user device (e.g., a user computer system), or a downloading of the recording to the user device. In one embodiment, the reference data 126 may directly reference a storage location of the messaging system 102 (e.g., within the database 112). In a further embodiment, the application system 104 may alias the originally received reference data 126 so that the reference is initially directed to the application system 104, which may then redirect the request to retrieve the message content 114 to the message system database 112. It will also be appreciated that in various embodiments, the message content 114 may actually be transferred from the message system database 112 to the application system database 134, in which case the reference data 126 may point to a location within this database 134. In yet a further embodiment, the message content may be stored at a third party storage location, and the reference data 126, as presented to a user, may point to such a third party storage facility.

At operation 226, the message content may be presented to a user of the user device (e.g., reproduced audibly via the user device), and the count indicator within the interface updated. The method 200 may then terminate at operation 228.

Figure 3:
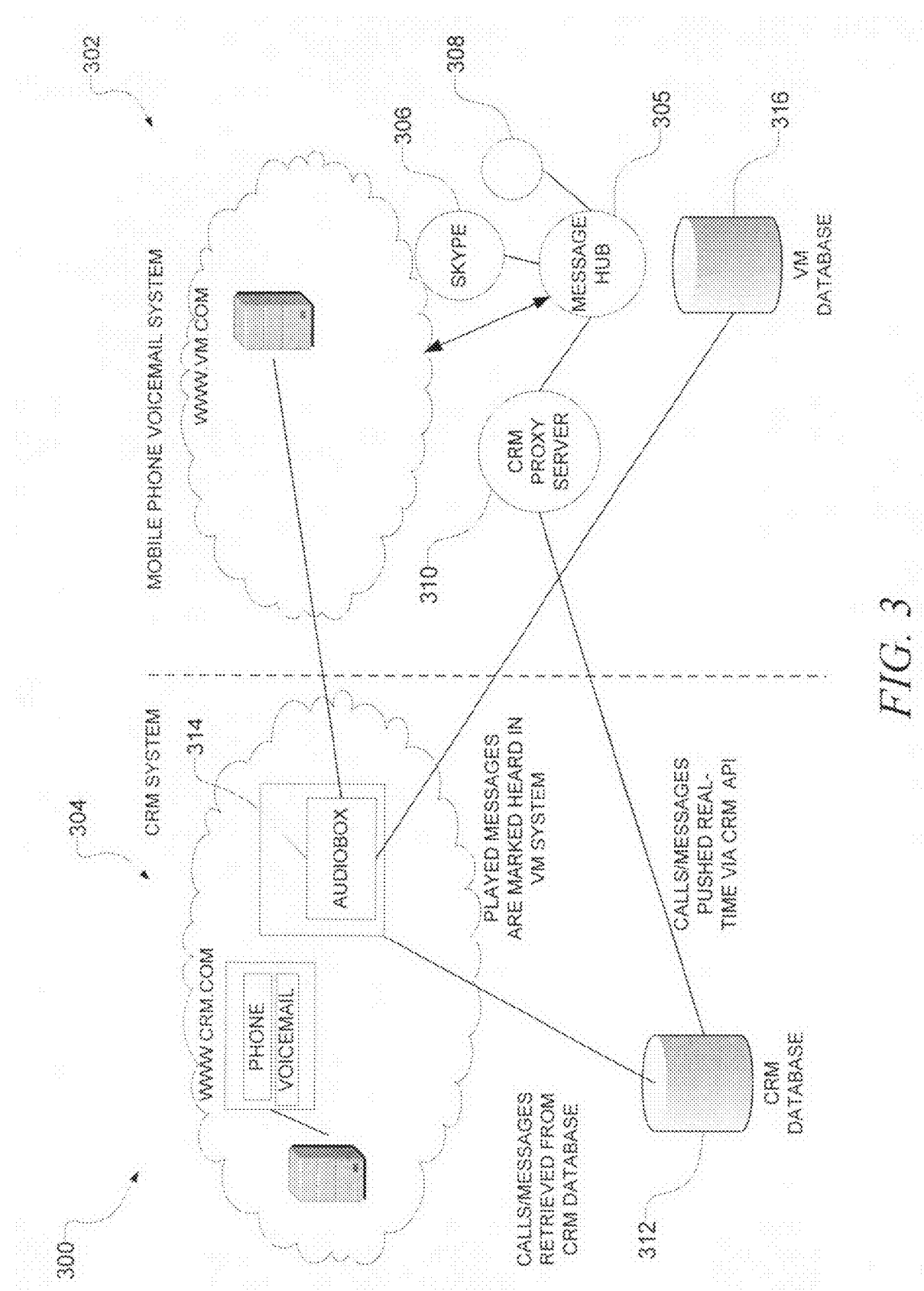
FIG. 3 is a diagrammatic representation of an environment in which a voicemail system and Customer Relationship Management (CRM) system are partially integrated with respect to message processing.

FIG. 3 is a diagrammatic representation of an environment 300, according to an example embodiment, showing interaction between a messaging system, in the example form of a mobile phone voicemail system 302 and an application system in the example form of a CRM system 304. The integration between the voicemail system 302 and the CRM system 304 may be composite in nature, with components hosted and maintained on both ends. The environment 300 may enable the pushing of call and message records into a data store of the CRM system 304 in real time, where they can be viewed and related to other CRM entities. CRM users may interact with calls and messages within the CRM system 304. The voicemail system 302 may include a message hub 305, which is shown to be connected to a Voice over IP (VoIP) communication system 306 (e.g., SKYPE), as well as any number of other communication systems 308. The message hub 305 may communicate with the CRM system 304 via a CRM proxy server 310 which operates to push calls and messages in near real time, via a CRM API to a CRM database 312. An "audio box" interface 314 of the CRM system 304 may enable messages (e.g., a message data object), retrieved from the CRM database, to be displayed to users of the CRM system 304. As such, message data objects may be retrieved from CRM database 312 and displayed within the context of the "audio box" 314. User selection of reference data within the context of the audio box 314 causes a redirect to a voicemail database 316 from which the message content is accessed and replayed, in the manner described above.

In an example embodiment, integration between the voicemail system 302 and the CRM system 304 may include the "synchronization" or association of two data objects, namely message and entity data objects 142 and 138. In one embodiment, a message data object 142 may be formatted as shown in the below example:

| Application Field | Type | Messaging Field |
|---|---|---|
| Name_c | Text (50) | n/a |
| Number_c | Text (12) | Number |
| Play_c | Text (50) | n/a |
| Length_c | Text (5) | Length |
| Message_ID_c | Text (25) | Calllogid |
| User_ID_c | Text (25) | Userid |
| Sent_Time_c | Date/Time | Stime |
| Lead | Text (50) | n/a |
| Contact | Text (50) | n/a |
| Opportunity | Text (50) | n/a |
| Type_c | Number (1) | Type |
| Transcription_c | Text (32000) | ? |
| Private_c | Number (1) | n/a |
| Status_c | Number (1) | Status |

Note that the message object contains both application and messaging fields, this arrangement providing a mapping between respective fields in the data schemas of the voicemail system 302 and the CRM system 304.

The CRM system 304 may also utilize call log objects, an example of which is provided below:

| Field | Type |
|---|---|
| Comments | Text (32000) |
| Email | Text (50) |
| Name | Text (50) |
| Phone | Text (12) |
| Priority | Text (50) |
| Related_To | Text (50) |

As will be noted, one of the fields of the call log object is a "related to" field, which may be utilized to establish an association between a call log object and a message object.

Figure 4:
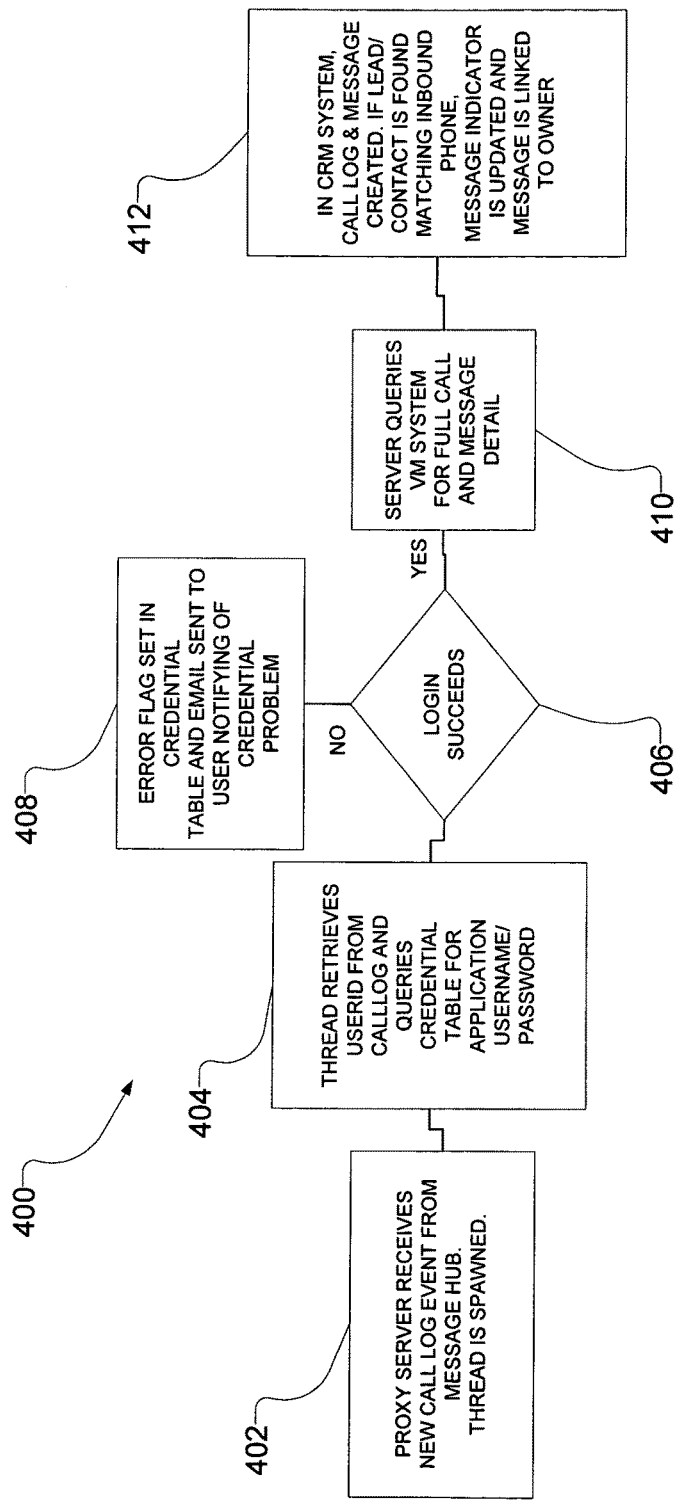
FIG. 4 is a flowchart illustrating a method, according to an example embodiment, to process a call log event within the context of the example environment shown in FIG. 3.

FIG. 4 is a flowchart illustrating a method 400, according to an example embodiment, to facilitate interactions between the voicemail system 302 and the CRM system 304.

At operation 402, the CRM proxy server 310 may receive a new call log event from the message hub 305, and a thread, dedicated to the relevant call log event, is spawned within the CRM proxy server 310.

At operation 404, the thread retrieves user identification information from the call log, and queries a credential table within the CRM database 312 for application username and password data.

At determination operation 406, a determination is made as to whether a successful login has occurred. If not, at operation 408, an error flag may be set in a credential table (not shown), and an email sent to the user notifying the user of the credential problem.

On the other hand, following a successful login, at operation 410, a server of the CRM system 304 may query the voicemail system 302 for call and message details.

At operation 412, the CRM system 304 may create a call log and message objects (e.g. formatted as described above). If lead or contact information is found matching an inbound phone number (as represented within the retrieved call and message details), a message indicator is updated to indicate the receipt of a new message by the voicemail system 302, and the message is linked (e.g., utilizing the reference data) to an appropriate entity (e.g., owner).

As discussed above, a presentation interface 144 of an application system 104 may generate interface data (e.g., HTML documents) presenting message indicators, in conjunction with message originator identification information, in a number of formats and views. FIGS. 5-9 are screenshots, providing examples of such interfaces.

Figure 5:
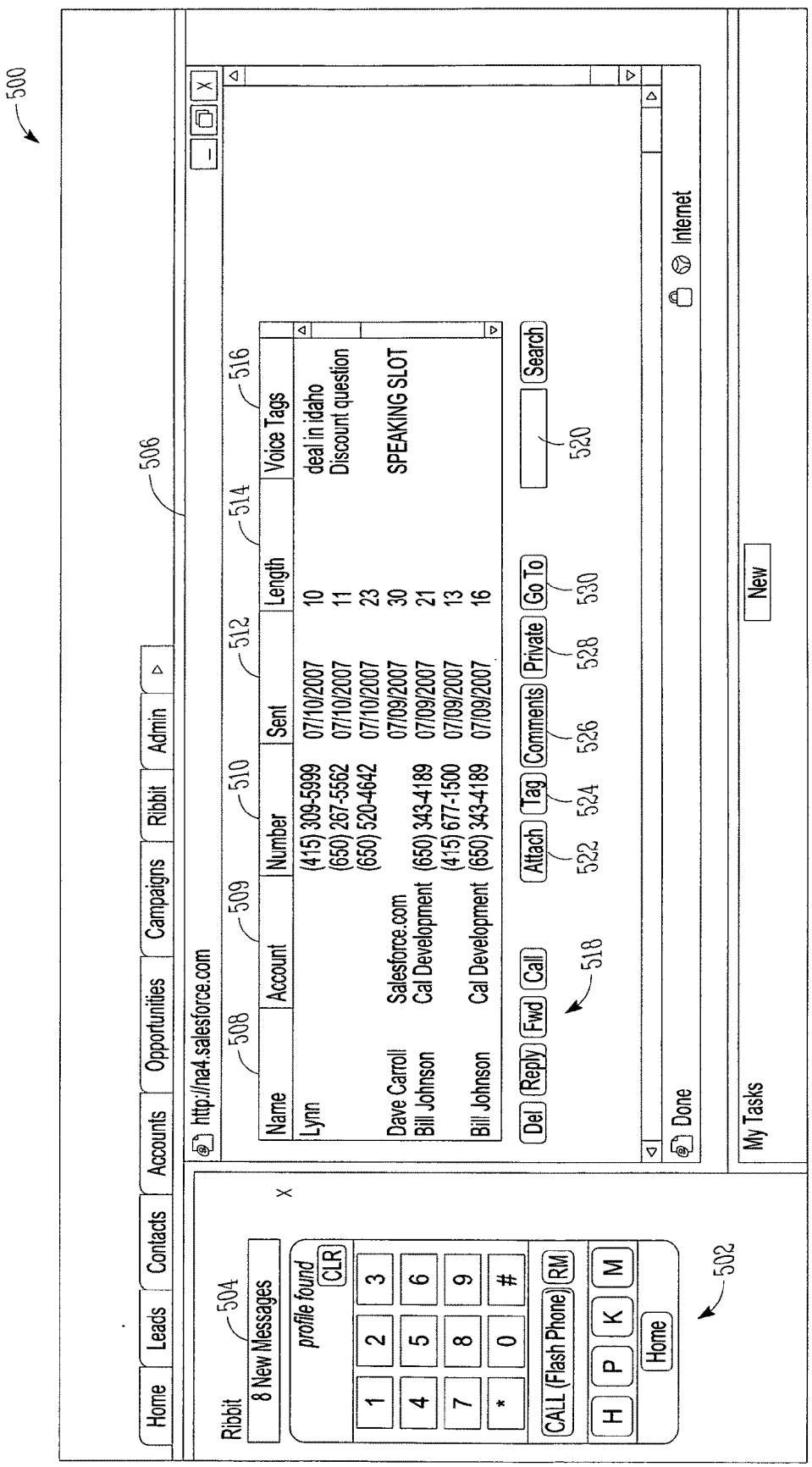

FIG. 5 is a screenshot of an example general voicemail access interface 500, which includes an integrated web based phone component 502 which may be utilized to initiate, for example, Voice-over-Internet Protocol (VoIP) calls. The integrated web based phone component 502 includes a "new messages" button 504 with a total of new messages that are waiting for first time retrieval by a user of an application system 104. User selection (e.g., by clicking) of the new messages button 504 invokes a user specific message box 506 in a separate window. The message box 506 presents a list of all messages for which the logged-in user of the application system 104 is an intended recipient. Unheard messages may be presented at the top of the list, and are color-coded with shading. Fields within the message box 506 include a name field 508, which is associated with a lead or contact in the application system 104 (e.g., where the application system 104 is the CRM application). A "related account" field 509 may also be displayed indicating an account with which the lead or contact associated. A number field 510 includes the telephone number from which the inbound call originated, while a sent field 512 indicates a date and time at which the message was received. A length field 514 indicates duration of the message, in minutes and seconds, and a tags field 516 allows a user to add text tags (e.g., categorizations) to a message. An expansion icon field (not shown) may open two text fields directly below the message which may display, in one example embodiment, a text transcription of a message if available. A second text field invocable by the expansion icon may enable a user to author and associate comments with any particular voicemail. For example, the user may wish to note that an attempt was made to return the call message on a particular time at a particular date.

The message box 506 also includes a navigation component 518 which enables a user to act on any one or more of the messages contained in the message list. Double-clicking on a particular message, for example, automatically starts a reproduction of the message through a user device (e.g., a computer system). After playing selected messages, remaining unheard messages are played in a Last In, First Out (LIFO) order. The navigation component 518 is invoked as a message starts playing, and may include a visual slider that advances as the message plays. A message within the list can also be played by clicking on the message once, and clicking the play button on the player. The navigation component 518 may also include rewind, jump ahead, pause and stop replay buttons.

The navigation component 518 also enables a user to act on a message in a number of ways. For example, a user may delete, reply to, or forward the voicemail message. Additionally, a user can, by clicking a call button, initiate a return call to the inbound telephone number.

The message box 506 may also include a search input field 520 into which a user can input text in order to search messages within the message box 506.

An attach button 522, also displayed within the message box 506, may be used or selected to invoke a dialogue box to allow a user to attach a message to a data object of the application system 104. For example, a message (as represented by a message data object 142) may be manually associated with a new call log entry, as an example entity data object 318. This functionality may be supported by the manual association module 133, described above with reference to FIG. 1.

Figure 6:
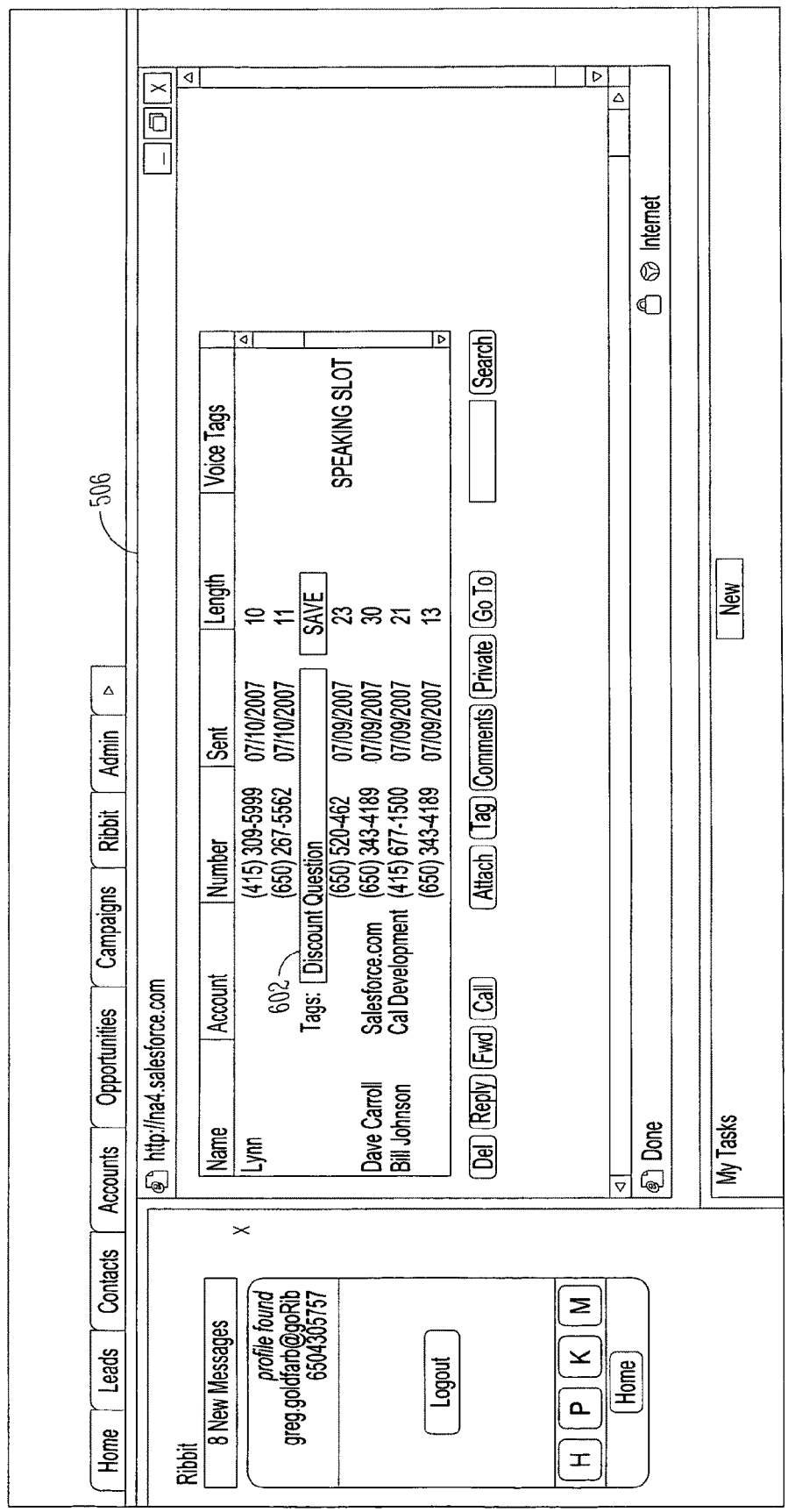

A tag button 524 is used to advance a user's cursor to a tag textbox next to the relevant message (i.e., within a tags field 602 as shown in FIG. 6). A user may then input tag information into the tags field 602 to semantically tag a message.

User selection of a comments button 526 expands fields below a selected message and places the user's cursor inside a comment box. A user may input comments, to be associated with a message into the comment box.

A user selection of a private button 528 marks a selected message as private and color codes the message in grey. As noted above, private messages are not visible to other users of an application system 104.

A GoTo button 530 is user selectable to present the user with a detailed page regarding a particular entity data object (e.g., a lead or contact) associated with a selected message.

FIG. 7 is a screenshot showing an example contact tab list interface 700, in which a new message indicator 702 is displayed in association with the name of a user (and also an organization of that user) that has left a new message. The indicator 702 may reflect a count of total new messages from the particular contact, and clicking on the new message indicator 702 may invoke a message box for the selected individual (e.g., a contact-specific message box).

Figure 8:
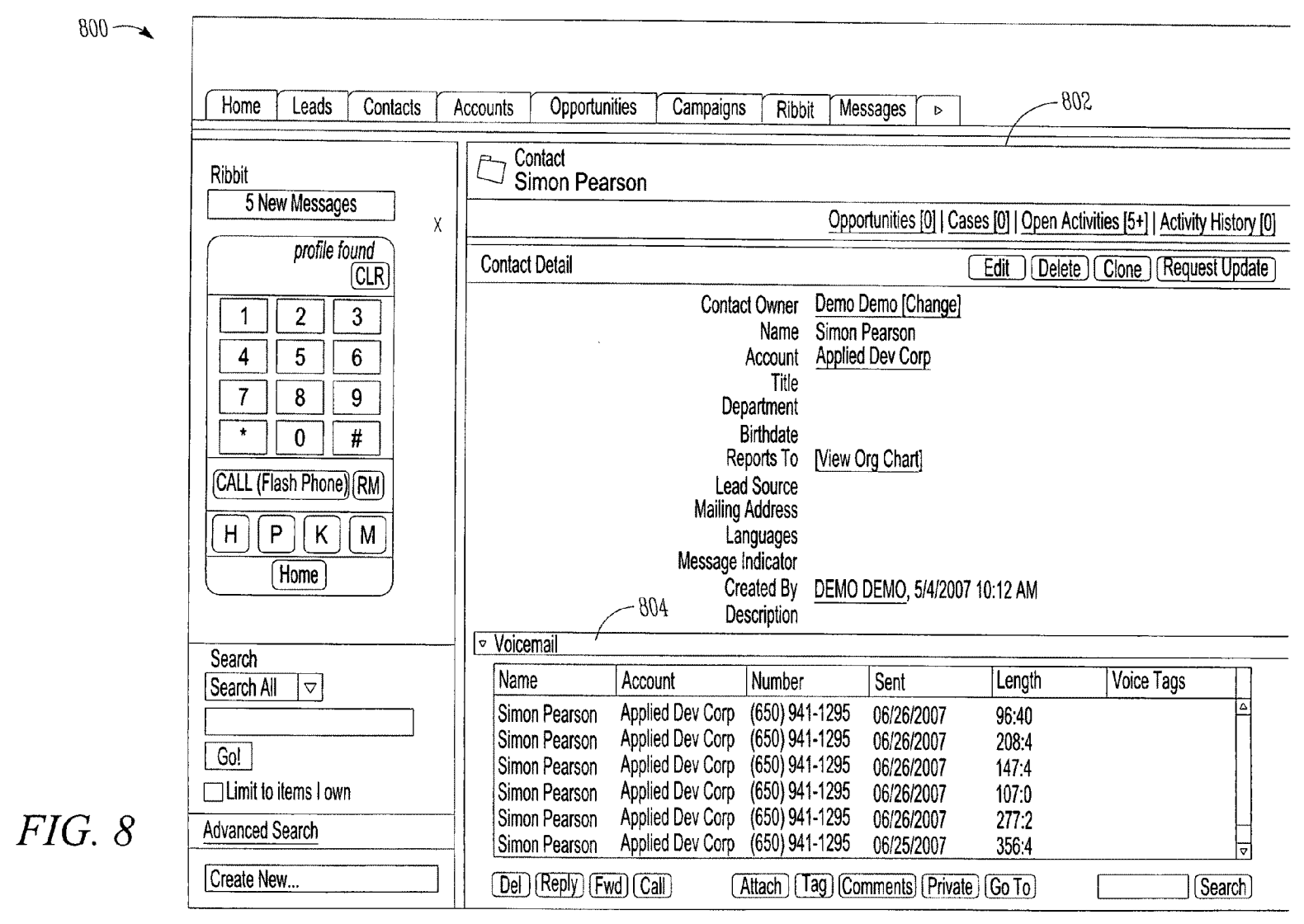

FIG. 8 is screenshot showing an example lead and contact detail interface 802, which contains detailed information regarding a particular contact (e.g., as may be maintained within an entity data object), together with a list of voicemails received from that contact. The list of voicemails is presented in a voicemail interface 804, each voicemail being represented within the application system 104 by a respective message data object 142. Accordingly, it will be appreciated that an entity data object for the contact (e.g., Simon Pearson) has multiple associations, one with each of the message data objects 142 representing the messages displayed within the voicemail interface 804.

Figure 9:
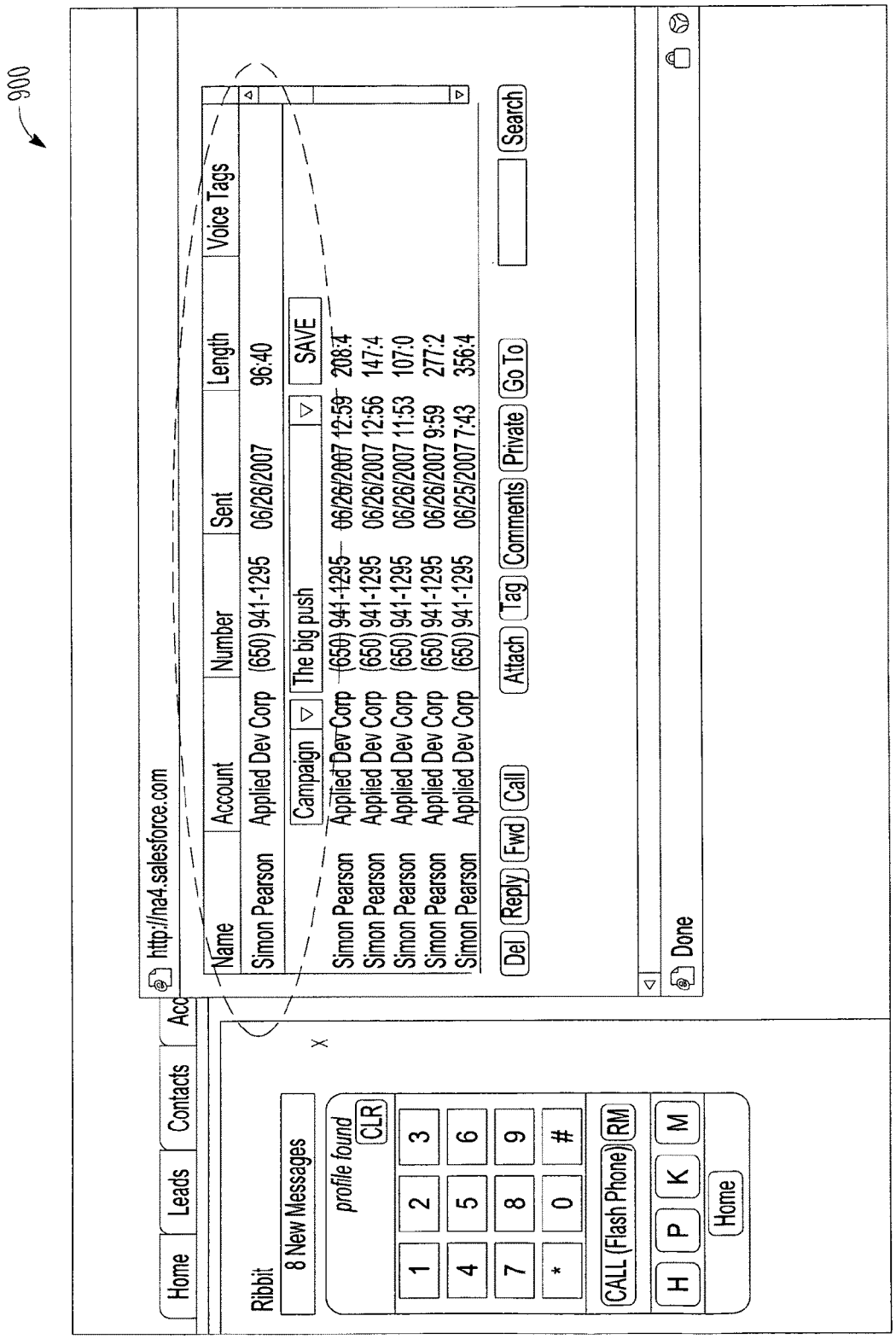

FIG. 9 is a screenshot illustrating a voice message management interface 900, according to an example embodiment.

The interface shown in FIG. 9 enables a user conveniently to associate a particular message data object 142 with another entity data object within the application system 104. Consider that, in an example embodiment in which the application system 104 is a CRM system, an entity data object 138 may exist for contacts, leads or customer organizations. Additionally, entity data objects 138 may be representative of an event, process, contract, opportunity, project or campaign. Utilizing the interface 900, a user may conveniently associate a message data object 142 with any one or more of these further entity data objects 138. For example, where a voicemail relates to an event or a campaign for which an entity data object 138 also exists within the application system 104, the interface may be utilized to associate the particular voicemail with such an event or campaign. As a result of this function, users are able to deploy voice content into a data centric set of workflow processes.

Figure 10:
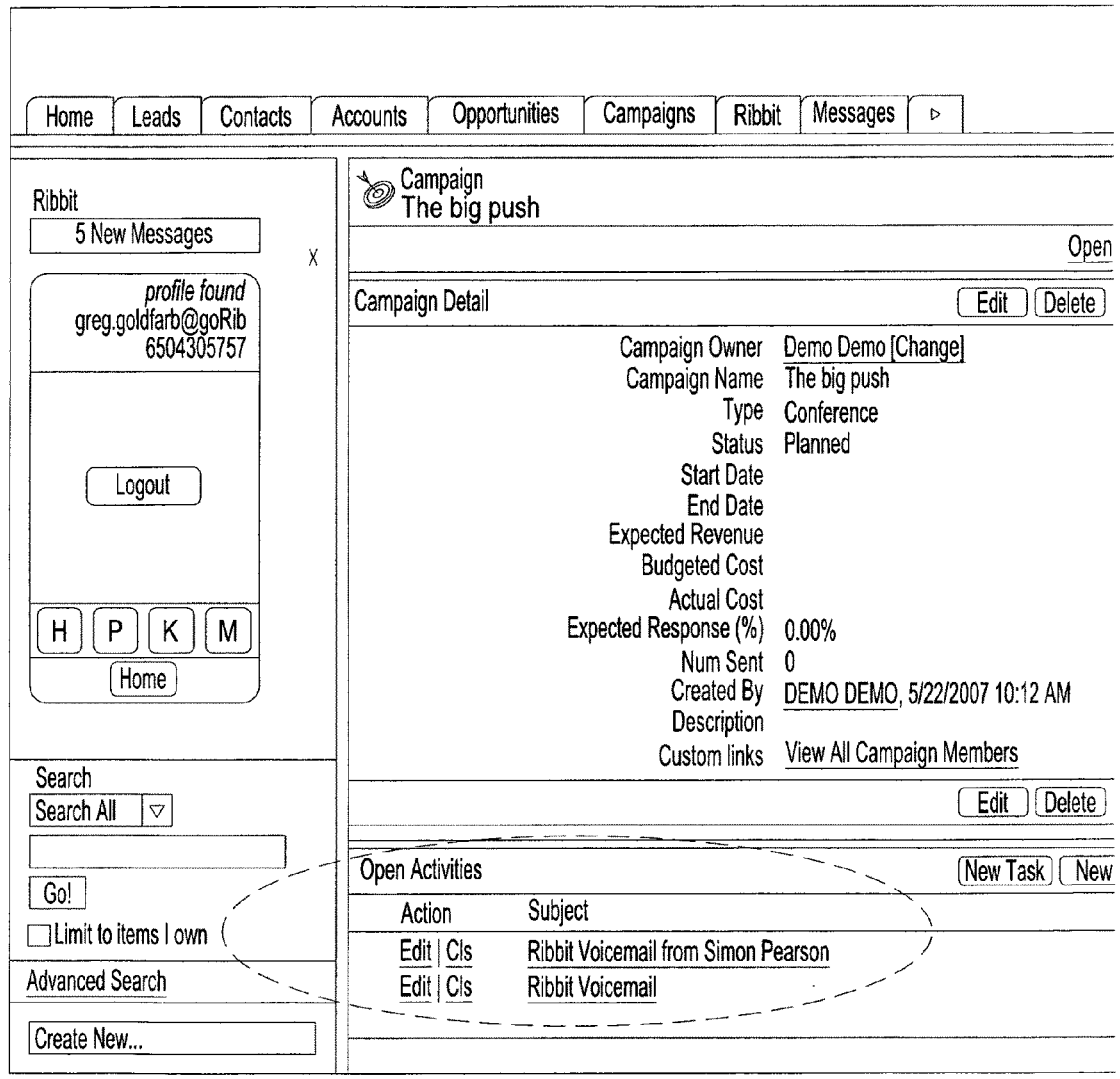

FIG. 10 is a screenshot illustrating a campaign detail interface 1000, according to an example embodiment. Two voicemails, which have been associated with a particular campaign, are identified as "open activities" related to the relevant campaign.

Figure 11:

FIG. 11 is a screenshot illustrating a task interface 1100, according to an example embodiment. In this example, a voicemail, represented by a message data object 142, is shown to have been designated as a "task" within the application system 104.

Modules, Components and Logic

Certain embodiments are described herein as including logic or a number of modules, components or mechanisms. A module, logic, component or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g. a computer program tangibly embodied in an information carrier, e.g., in a computer-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Computer-Readable Medium

Figure 12:
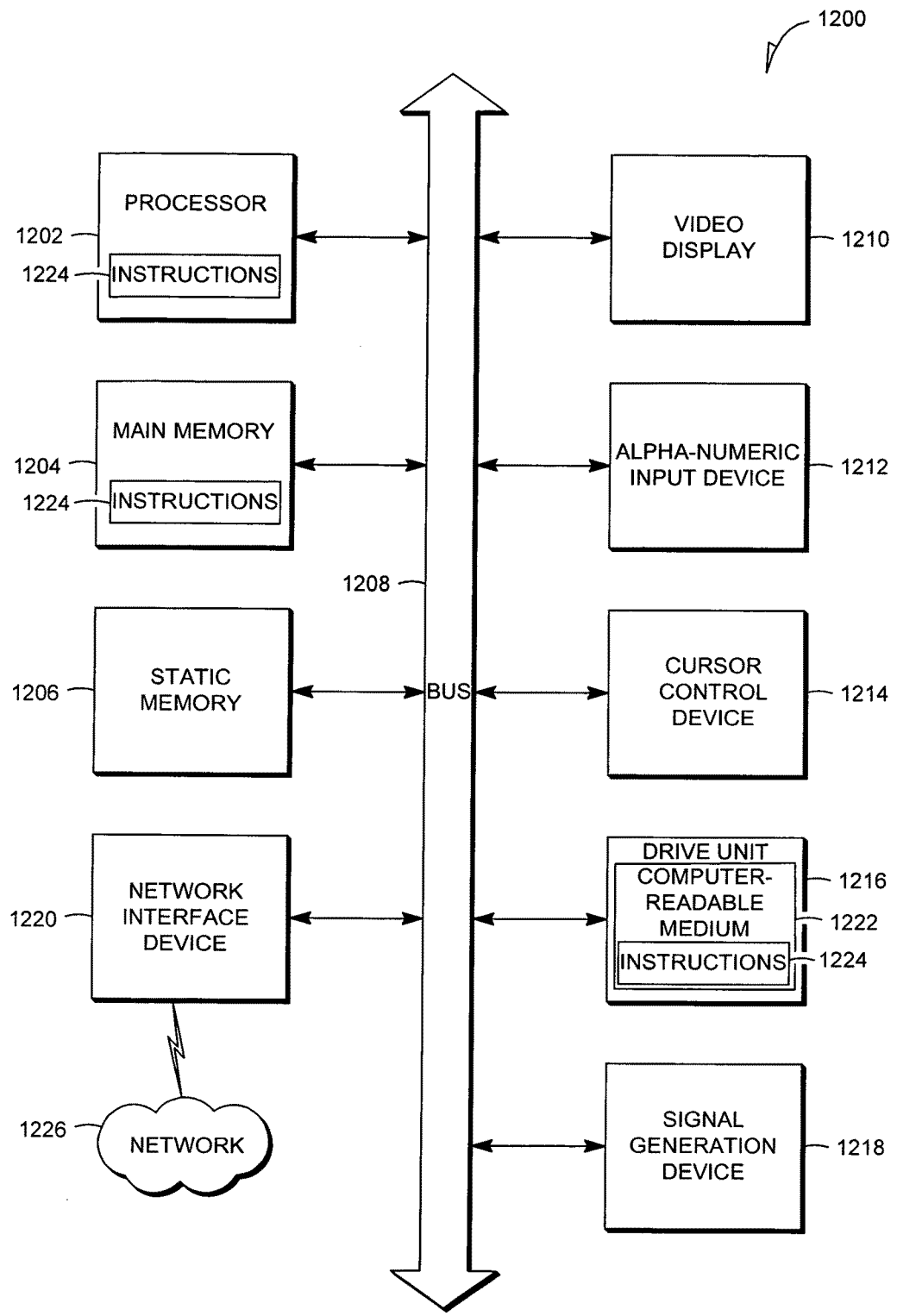
FIG. 12 is a block diagram illustrating a machine within which instructions, for causing the machine to perform any one or more of the methodologies discussed herein, may be executed.

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

Computer-Readable Medium

The disk drive unit 1217 includes a computer-readable medium 1222 on which is stored one or more sets of instructions and data structures (e.g., software 1224) embodying or utilized by any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting computer-readable media.

While the computer-readable medium 1222 is shown in an example embodiment to be a single medium, the term "computer-readable medium" may include a single medium or multiple media (e.g., a centralized or distributed database, and/or associated caches and servers) that store the one or more instructions. The term "computer-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "computer-readable medium" shall accordingly be taken to include, but not be limited to, solid-state memories, and optical and magnetic media. Specific examples of computer-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 1224 may further be transmitted or received over a communications network 1226 using a transmission medium via the network interface device 1220 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above described tiers, and processes or operations about constituting these tiers may be implemented as components. Common too many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:

receiving a voicemail data object, from an interface, at a business application system, the voicemail data object being associated with a voicemail originated from a caller, the voicemail received at a messaging system, and including a caller identifier identifying the caller that originated the voicemail, the caller identifier including at least one of a plurality of elements comprising a caller telephone number, a caller name, and an account identifier;

automatically associating, using an association component including a matching module, the voicemail data object with an entity data object retrieved from the business application system, a determination of the entity data object being based on a matching operation by the matching module between the caller identifier and an entity identifier of the entity data object, the entity data object containing information related to the caller, the association being between the voicemail data object and the matched entity data object; and presenting a voicemail indicator, by a presentation interface, to a messaging system of a user of the business application system based on the association with the entity data object, the presentation of the voicemail indicator being in conjunction with presenting caller identification information for the caller, the presenting of the voicemail indicator including presenting a message entry, in association with the caller identification information, together with other entries in a dedicated message interface of a recipient of the voicemail.

2. The method of claim 1, including, prior to the associating of the voicemail data object with the entity data object, determining whether the voicemail data object is related to at least one of a plurality of entity data objects of the business application system, and associating the voicemail data object with the entity data object based on the determination.

3. The method of claim 2, including instantiating the entity data object within the business application system based on a determination that the voicemail data object is not related to at least one of the plurality of entity data objects of the business application system.

4. The method of claim 1, wherein the voicemail data object includes a reference to a recording of the voicemail, the method including, responsive to a selection event with respect to the voicemail indicator, retrieving the recording of the voicemail.

5. The method of claim 4, wherein the retrieving of the recording of the voicemail includes at least one of streaming the recording of the voicemail to a user device, or downloading the recording of the voicemail to the user device.

6. The method of claim 4, wherein the reference identifies a storage location from which the recording of the voicemail is retrievable, and the retrieving of the recording of the voicemail includes retrieving the voicemail recording from the storage location.

7. The method of claim 6, wherein the storage location is within a storage facility that is separate from the business application system and that is associated with a voicemail system.

8. The method of claim 1, wherein the caller identifier further includes at least one of a plurality of elements comprising a caller address, a caller account number, a project identifier, and a purchase order number.

9. The method of claim 1, including supplementing the voicemail data object with supplemental data retrieved from the business application system.

10. The method of claim 9, wherein the business application system is a customer relationship management (CRM) system, and wherein the supplemental data comprises at least one of relationship stage data, task data identifying a task associated with a relationship with the caller, other entities related to the relationship with a caller, or opportunity data related to an opportunity associated with the caller.

11. The method of claim 1, wherein the entity data object is representative of at least one of a person, organization, account or a relationship.

12. The method of claim 1, wherein the entity data object is representative of at least one of an event, process, project or campaign.

13. The method of claim 1, wherein the voicemail indicator is presented in association with the caller identification information in a contact list presented by the business application system.

14. The method of claim 1, wherein the voicemail indicator is presented within a contact interface dedicated to at least one of the caller or an entity with which the caller is associated.

15. The method of claim 1, including enabling the user of the business application system to manually associate the voicemail object with a further entity data object of the business application system.

16. The method of claim 1, wherein the voicemail data object includes metadata pertaining to the voicemail, the metadata including at least one of the caller identifier, a recipient identifier, time and date information, storage size data indicating a storage size for a recording of the voicemail or duration information indicating a duration of the voicemail, note information pertaining to the voicemail, tag information to categorize the voicemail, text transcription of the voicemail, information regarding an accessed or unaccessed status, follow-up required information, urgency information, and association information with other objects of the business application system.

17. A system comprising:
a message data object creation component, having one or more processors, to:
receive a voicemail data object at a business application system, from an interface, the voicemail data object being associated with a voicemail originated from a caller, the voicemail received at a messaging system, and including a caller identifier identifying the caller that originated the voicemail, the caller identifier including at least one of a plurality of elements comprising a caller telephone number, a caller name, and an account identifier; and
an association component having a matching module to automatically associate the voicemail data object with an entity data object to be retrieved from the business application system, a determination of the entity data object being based on a matching operation by the matching module between the caller identifier and an entity identifier of the entity data object, the entity data object containing information related to the caller, the association being between the voicemail data object and the matched entity data object; and
a presentation interface to present a voicemail indicator to a messaging system of a user of the business application system based on the association with the entity data object, the presentation of the voicemail indicator being in conjunction with presenting caller identification information for the caller, the voicemail indicator to present a message entry, in association with the caller identification information, together with other entries in a dedicated message interface of a recipient of the voicemail.

18. The system of claim 17, wherein the association component, prior to the associating of the voicemail data object with the entity data object, is to determine whether the voicemail data object is related to at least one of a plurality of entity data objects of the business application system, and is to associate the voicemail data object with the entity data object based on the determination.

19. The system of claim 18, wherein the association component is to instantiate the entity data object within the business application system based on a determination that the voicemail data object is not related to at least one of the plurality of entity data objects of the business application system.

20. The system of claim 17, wherein the voicemail data object includes a reference to a recording of the voicemail, the recording of the voicemail being retrievable using the reference.

21. The system of claim 17, wherein the caller identifier further includes at least one of a plurality of elements comprising a caller address, a caller account number, a project identifier, and a purchase order number.

22. The system of claim 17, including a supplementing component to supplement the voicemail data object with supplemental data retrieved from the business application system.

23. The system of claim 22, wherein the business application system is a customer relationship management (CRM)

system, and wherein the supplementing component is to supplement the voicemail data object with at least one of relationship stage data, task data identifying a task associated with a relationship with the caller, other entities related to the relationship with a caller, or opportunity data related to an opportunity associated with the caller.

24. The system of claim 17, wherein the entity data object is representative of at least one of a person, organization, account or relationship.

25. The system of claim 17, wherein the entity data object is representative of at least one of an event, process, project or campaign.

26. The system of claim 17, wherein the presentation interface is to present a message entry, in association with the caller identification information, together with other entries in a dedicated message interface of a recipient of the voicemail.

27. The system of claim 17, wherein the presentation interface is further to present the voicemail indicator in association with the caller identification information in a contact list presented by the business application system.

28. The system of claim 17, wherein the presentation interface is further to present the voicemail indicator within a contact interface dedicated to at least one of the caller or an entity with which the caller is associated.

29. The system of claim 17, including a manual association module to enable a user of the business application system to manually associate the voicemail object with a further entity data object of the business application system.

30. A system comprising:
   means for receiving a voicemail data object at a business application system, the means for receiving including an interface, the voicemail data object being associated with a voicemail originated from a caller, the voicemail received at a messaging system, and including a caller identifier identifying the caller that originated the voicemail;
   means for automatically associating the voicemail data object with an entity data object located in the business application system, the means for automatically associating including a matching means, a determination of the entity data object being based on a matching operation by the matching means between the caller identifier and an entity identifier of the entity data object, the entity data object containing information related to the caller, the association being between the voicemail data object and the matched entity data object; and
   means for presenting a voicemail indicator to a messaging system of a user of the business application system based on the association with the entity data object, the means for presenting including a presentation interface, the presentation of the voicemail indicator being in conjunction with presenting of caller identification information for the caller, the voicemail indicator to present a message entry, in association with the caller identification information, together with other entries in a dedicated message interface of a recipient of the voicemail.

31. A computer-readable storage device having no transitory signals and embodying instructions that, when executed by one or more processors, cause the processors to perform the following operations, comprising:
   receiving a voicemail data object, from an interface, at a business application system, the voicemail data object being associated with a voicemail originated from a caller, the voicemail received at a messaging system, and including a caller identifier identifying the caller that originated the voicemail;
   automatically associating the voicemail data object, by an association component including a matching module, with an entity data object retrieved from the business application system, a determination of the entity data object being based on a matching operation by the matching module between the caller identifier and an entity identifier of the entity data object, the entity data object containing information related to the caller, the association being between the voicemail data object and the matched entity data object; and
   presenting a voicemail indicator, by a presentation interface, to a user of the business application system based on the association with the entity data object, the presentation of the voicemail indicator being in conjunction with presenting caller identification information for the caller, the voicemail indicator to present a message entry, in association with the caller identification information, together with other entries in a dedicated message interface of a recipient of the voicemail.

* * * * *